(12) United States Patent
Hunger et al.

(10) Patent No.: US 9,937,563 B2
(45) Date of Patent: Apr. 10, 2018

(54) DRILL CHUCK, DRILLING NEEDLE AND DRILLING NEEDLE-DRILL CHUCK ASSEMBLY

(71) Applicant: IML—Instrumenta Mechanik Labor GmbH, Wiesloch (DE)

(72) Inventors: Sebastian Hunger, Wiesloch (DE); Fabian Hunger, Leimen (DE); Erich Hunger, Karlsruhe (DE)

(73) Assignee: IML—Instrumenta Mechanik Labor GmbH, Wiesloch (DE)

( * ) Notice: Subject to any disclaimer, the term of this patent is extended or adjusted under 35 U.S.C. 154(b) by 102 days.

(21) Appl. No.: 15/021,351

(22) PCT Filed: Sep. 10, 2014

(86) PCT No.: PCT/EP2014/002442
§ 371 (c)(1),
(2) Date: Mar. 11, 2016

(87) PCT Pub. No.: WO2015/036114
PCT Pub. Date: Mar. 19, 2015

(65) Prior Publication Data
US 2016/0221087 A1    Aug. 4, 2016

(30) Foreign Application Priority Data

Sep. 13, 2013  (DE) .......................... 10 2013 015 131

(51) Int. Cl.
*B23B 31/22*    (2006.01)
*B23B 31/28*    (2006.01)
*B23B 31/00*    (2006.01)

(52) U.S. Cl.
CPC .......... *B23B 31/223* (2013.01); *B23B 31/005* (2013.01); *B23B 31/22* (2013.01);
(Continued)

(58) Field of Classification Search
CPC ..... B23B 31/005; B23B 31/22; B23B 31/223; B23B 31/1071; B23B 31/1072;
(Continued)

(56) References Cited

U.S. PATENT DOCUMENTS 973,345 A * 10/1910 Dalton .................. B23B 31/223
279/72
1,269,434 A * 6/1918 Harling ............... B23B 31/1071
279/71

(Continued)

FOREIGN PATENT DOCUMENTS

DE        4105515 A1   8/1992
DE       10031338 A1   1/2001
(Continued)

*Primary Examiner* — Eric A Gates
*Assistant Examiner* — Chwen-Wei Su
(74) *Attorney, Agent, or Firm* — Gudrun E. Huckett

(57) ABSTRACT

The invention relates to a drill chuck which has a drilling needle receptacle device for removable receiving of a drilling needle (1), a hollow cylindrical magnetic holder for the drilling needle receptacle device and a coupling device for torque transfer from a drive device to the drilling needle receptacle device. The drilling needle receptacle device, in which a drilling needle (1) having a flattened end section (1') can be received, has a receptacle element (7), at least two clamping bodies (10) and a clamping insert (6). The receptacle element (7) has at least one cylindrical section (72) having a recess (71) and the clamping insert (6) has counter-molded bodies (61) which supplement the clamping bodies (10) and which extend away from a stop disc (62). The stop disc (62) contacts a face of the cylindrical section (72) and has a lead-through opening (63) for the drilling needle (1). The counter-molded body (61) and the clamping bodies (10) are designed in respect of the dimensions and shape thereof for arrangement in the recess (71) and for clamping receiving of the flattened end section (1') of the drilling needle (1) between the clamping bodies (10) and the counter-molded bodies (61). The invention further relates to a drilling needle and to a drilling needle-drill chuck assembly.

19 Claims, 7 Drawing Sheets

(52) U.S. Cl.
CPC ....... *B23B 31/28* (2013.01); *Y10T 279/17717* (2015.01); *Y10T 279/17726* (2015.01); *Y10T 279/17803* (2015.01); *Y10T 279/23* (2015.01); *Y10T 279/26* (2015.01)

(58) Field of Classification Search
CPC ... B23B 31/1612; B23B 31/28; B23B 31/008; Y10T 279/23; Y10T 279/26; Y10T 279/17726; Y10T 279/17717; Y10T 279/17803
See application file for complete search history.

(56) References Cited

U.S. PATENT DOCUMENTS

| | | | | |
|---|---|---|---|---|
| 1,406,220 | A * | 2/1922 | Pickett | B23B 31/22 279/16 |
| 2,400,169 | A | 5/1946 | Seiffert | |
| 2,539,045 | A * | 1/1951 | Waring | B23B 31/22 279/72 |
| 2,828,131 | A * | 3/1958 | Appleby | B23B 31/08 24/303 |
| 4,486,176 | A * | 12/1984 | Tardieu | A61C 1/00 310/103 |
| 4,614,137 | A * | 9/1986 | Jones | B23B 31/00 279/128 |
| 6,474,656 | B1 * | 11/2002 | Thomas | B23B 31/1071 279/30 |
| 7,766,585 | B2 * | 8/2010 | Vasudeva | B23B 31/005 279/22 |
| 2014/0109660 | A1 | 4/2014 | Hunger et al. | |

FOREIGN PATENT DOCUMENTS

| | | | |
|---|---|---|---|
| DE | 10031339 A1 | 2/2001 | |
| DE | 10 2011 103 636 A1 | 12/2012 | |
| GB | 713 042 | 8/1954 | |
| GB | 1274650 A * | 5/1972 | ........... B23B 31/005 |
| WO | 02/064295 A2 | 8/2002 | |

* cited by examiner

DRILL CHUCK, DRILLING NEEDLE AND DRILLING NEEDLE-DRILL CHUCK ASSEMBLY

BACKGROUND OF THE INVENTION

The following invention relates to an assembly of a drilling needle in a drill chuck for coupling with a drive device as well as to the drilling needle itself.

A "drill chuck" refers in this context to a clamping device that receives, on a tool, the employed tool such as a drill or here a drilling needle.

A frequently used drill chuck is a three-jaw chuck in which the part to be secured is clamped between three clamping jaws; this provides the advantage of a good centering action of the secured employed tool (e.g., drilling needle). Greater clamping forces can be achieved by gear ring drill chucks that can be tightened by means of a drill chuck key. Moreover, drill chucks for masonry drill bits on percussion drills are known that do not clamp the tool by friction but transmit torque by means of form fit and in this way enable axial movement of the tool.

Special drill chucks are also used in devices for drilling resistance measurement. With such drilling resistance measurement devices that employ a thin drilling needle, objects into which such a needle can be drilled can be examined in their interior with regard to their condition or their quality without destroying or significantly damaging the object. The drilling needle must be replaced regularly in order to provide reliable measured data.

In order to simplify replacement, DE 10 2011 103 636 A1 discloses a needle replacement cartridge and a drilling measurement device that is provided with this needle replacement cartridge. In this context, the drilling needle is secured fixedly on one end of a telescoping pipe while at the opposite end of the telescoping pipe a docking device is arranged with which the telescoping pipe and thus the drilling needle is coupled to a drive. This docking device comprises a magnetic holder that is connected releasably with the docking end of the telescoping pipe and comprises a coupling device, such as a claw coupling, snap-on coupling or a bayonet closure in order to transmit the torque from the drive device of the drilling measurement device to the telescoping pipe. The magnetic holder which is embodied as a hollow cylinder functions as a type of drill chuck and serves for axial centering of the telescoping pipe so that the drilling needle is aligned with the drive axis.

Usually, drilling needles are provided at their fastening section with a mechanical clamping device or a thread in order to be screwed to the drilling needle receptacle. Therefore, the drilling needles can be rotated only in one direction without becoming detached. Moreover, breakage of the drilling needle happens frequently particularly in the area of the drilling needle receptacle.

Clamping of a drilling needle with several clamping bodies is dealt with in DE 100 31 339 A1.

SUMMARY OF THE INVENTION

Based on this prior art, the present invention has the object to provide an improved drill chuck that enables operation of the drilling needle in both rotational directions (releasing and drilling) and that reduces the frequency of needle breakage.

This object is solved by a drill chuck of the aforementioned kind, wherein the drilling needle receiving device is configured for receiving a flattened end section of the drilling needle and comprises a receiving element, at least one clamping body, and a clamping insert, wherein the receiving element comprises at least one cylindrical section with a recess, and wherein the clamping insert comprises a counter body or bodies that supplement(s) the at least one clamping body and that extend(s) away from a stop disk, and wherein the stop disk is resting on an end face of the cylindrical section and comprises a through opening for the drilling needle, wherein the counter body or counter bodies and the at least one clamping body are configured in regard to dimensions and shape for arrangement in the recess and for providing a clamping receiving action of the flattened end section of the drilling needle between the clamping body or clamping bodies and the counter bodies.

A further object resides in providing a drilling needle that is suitable for being received in the drill chuck and is less prone to needle breakage in comparison to conventional drilling needles.

This object is solved by a drilling needle that comprises a flattened end section on one side and is receivable in a drilling needle receiving device of a drill chuck according to the invention.

Moreover, by means of the drilling needle-drill chuck assembly according to the invention a device is provided that combines the advantages of the drill chuck and of the drilling needle.

Preferred further embodiments are described in the dependent claims.

A drill chuck according to the invention comprises, in addition to a drilling needle receiving device in which a drilling needle can be releasably received, a hollow cylindrical magnetic holder for the drilling needle receiving device and a coupling device for torque transmission from a drive device to a drilling needle receiving device.

According to the invention, the drilling needle receiving device is designed for receiving a drilling needle that comprises, instead of a thread, a flattened end section with which the drilling needle is received in the drilling needle receiving device. Due to the flat surface, the drilling needle is secured in the drilling needle receptacle against slip. For receiving the flattened drilling needle end, the drilling needle receiving device comprises a receiving element and at least one clamping body and a clamping insert. The receiving element comprises at least one cylindrical section in which a recess is provided that opens at the end face of the cylindrical section. The clamping insert comprises one or a plurality of counter bodies which supplement the clamping body or clamping bodies and extend away from a stop disk which comes to rest against the end face of the cylindrical section when the counter body or counter bodies together with the clamping bodies are received in the recess of the receiving element. In order to be able to guide the drilling needle through the clamping insert into the recess of the receiving element, the stop disk of the clamping insert comprises a through opening for the drilling needle. The counter body or counter bodies of the clamping insert and the clamping body or clamping bodies are designed in regard to dimensions and shape in such a way that the flattened end section of the drilling needle is received by clamping action between the clamping body or clamping bodies and the counter body or counter bodies.

In order to compensate or make tolerable the imbalance caused by the flattened end section of the drilling needle upon rotation so that the concentric arrangement of the drilling needle and of a drive shaft of the drive device is not impaired, i.e., the drilling needle and the motor drive shaft extend centered, the coupling device of the drill chuck is embodied as a magnetic coupling. In this context, the drilling needle receiving device comprises a first coupling partner with a magnetic coupling disk which is brought into operative engagement in a contactless way with a magnetic coupling disk of a drive-associated coupling partner when the drill chuck is coupled with the drive device. Also, the hollow cylindrical magnetic holder is formed by an annular magnet that is arranged at a spacing and without contact coaxially about the cylindrical section of the receiving element. In order for the magnetic holder to be able to act on the receiving element, the latter, in a preferred embodiment, can be surrounded at the cylindrical section by a spacer ring that can be magnetically influenced.

The contactless magnetic coupling of the drilling needle receiving device with the drive device and the contactless arrangement of the receiving element in the drill chuck enable the unbalanced rotation of the receiving element in which the end section is received, wherein one of the clamping bodies in the cage that is formed by the counter bodies of the clamping insert effects respectively the clamping action of the drilling needle, depending on where the imbalance is occurring at the moment.

It is conceivable that the drilling needle receiving device is designed with only one or two clamping bodies and, as a supplement thereto, one or two counter bodies on the clamping insert; however, in order to obtain excellent smooth running, the drilling needle receiving device preferably comprises three clamping bodies or clamping body pairs and correspondingly also three counter bodies on the clamping insert. The clamping bodies can be designed cylindrical and the counter bodies can be formed so as to fill out the gaps between the clamping bodies. Alternatively, the clamping bodies can be embodied to be spherical wherein pairs of spherical clamping bodies are supplemented by the counter bodies of the clamping insert, respectively. The circumferential wall of the recess in the receiving element in which the clamping bodies and the supplementing counter bodies are arranged can be formed to be segmented in accordance with the number of clamping bodies. In order to be able to bring the drilling needle, received between the clamping bodies, into a rotationally fixed position in the recess by means of the counter bodies, each wall segment extends, following a spiral line, from a proximal segment section proximal relative to the drilling needle that can be received between the clamping bodies to a distal segment section, wherein each transition between the proximal segment section and the distal segment section of neighboring wall segments forms a stop which projects into the recess. Accordingly, the drilling needle can be clamped between the clamping bodies when they are moved in the recess toward the proximal segment sections and the clamping engagement is released in that the clamping bodies are moved toward the distal segment sections.

For connecting the first coupling partner with the receiving element, the magnetic coupling disk can be connected with a hollow cylinder section in which a pin section of the receiving element that adjoins the cylindrical section is received. The pin section is fixedly connected with the hollow cylinder section so that the torque transmission from the magnetic coupling disk to the drilling needle can be realized. If needed, the pin section and the hollow cylinder section can have a cross-section deviating from a circular cross-section and therefore can be connected by form fit with each other. Alternatively or additionally, fastening means such as pins or screws can be used. Of course, in a reversed arrangement the coupling partner can comprise a pin section which is arranged in a hollow cylindrical section of the receiving element. Also, further form fit and/or friction connections are conceivable.

The drill chuck according to the invention can moreover comprise a front cover that is provided with an opening for the drilling needle and further comprise a housing section that is releasably connectable or non-detachably connected to the front cover which, in turn, is detachably connected with a housing segment that surrounds the drive-associated magnetic coupling disk. The hollow cylindrical magnetic holder, i.e., the annular magnet, is preferably arranged at the inner wall of the housing section in correspondence with the position of the cylindrical section of the receiving element in order to center the latter while, due to the contactless configuration, permitting certain eccentric displacements caused by the unbalanced rotation.

In order to ensure the concentric arrangement of the drilling needle with the drive shaft when coupling the drill chuck with the drive device, the drill chuck can comprises a drilling needle guiding device which comprises a centering or guiding sleeve which is rotatably supported in the opening of the front cover.

Advantageously, in the drill chuck of the present invention the transmittable torque can be matched to the requirements in that a distance between the magnetic coupling disks is adjustable for variation of the transmitted torque.

This adjustability of the distance can be realized by means of an axial adjustability of the housing section relative to the housing segment.

A further subject matter of the invention is the drilling needle itself which is flattened at one side at the section that is provided for being received in the drill chuck so that it is secured in the drill chuck against slip.

Advantageously, the drilling needle according to the invention provided with the flattened end section instead of the thread is less prone to needle breakage. This is so because, for the same diameter of the drilling needle, the cross-section at the flattened end is greater than the core diameter of the thread of a comparable drilling needle.

In a preferred embodiment it is provided that the cross-sectional size of the drilling needle measured at a right angle to the flattened portion of the end section is at most 5% smaller than the diameter of the drilling needle.

An assembly comprised of the drill chuck according to the invention and the drilling needle according to the invention which is received in the drilling needle receiving device of the drill chuck combines the aforementioned advantages.

BRIEF DESCRIPTION OF THE DRAWINGS

These and further advantages will be explained in the following description with reference to the accompanying Figures. The reference to the Figures in the description serves for facilitating understanding of the subject matter. The elements or parts of the elements which are substantially identical or similar can be provided with the same reference characters. The Figures are only schematic illustrations of embodiments of the invention. It is shown in.

DESCRIPTION OF REFERRED EMBODIMENTS

In the Figures, an exemplary embodiment of the drilling needle-drill chuck assembly according to the invention is illustrated but the scope of protection is not limited thereto. For example, other housing solutions and variants of the magnetic coupling or of the connection of the coupling disks with drive shaft and receiving element are conceivable without departing from the scope of protection of the invention.

Figure 1:
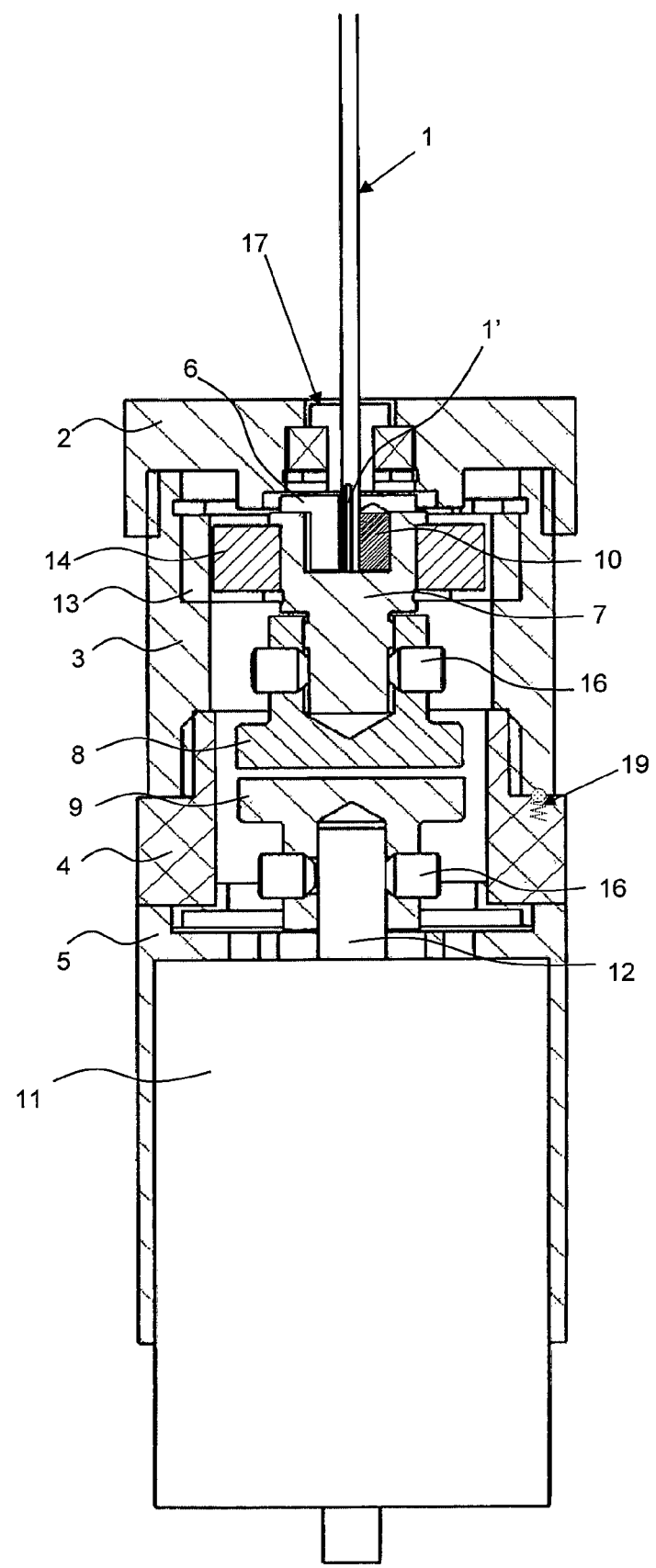
FIG. 1 a longitudinal section of the drill chuck according to the invention with clamped drilling needle.
Figure 9:
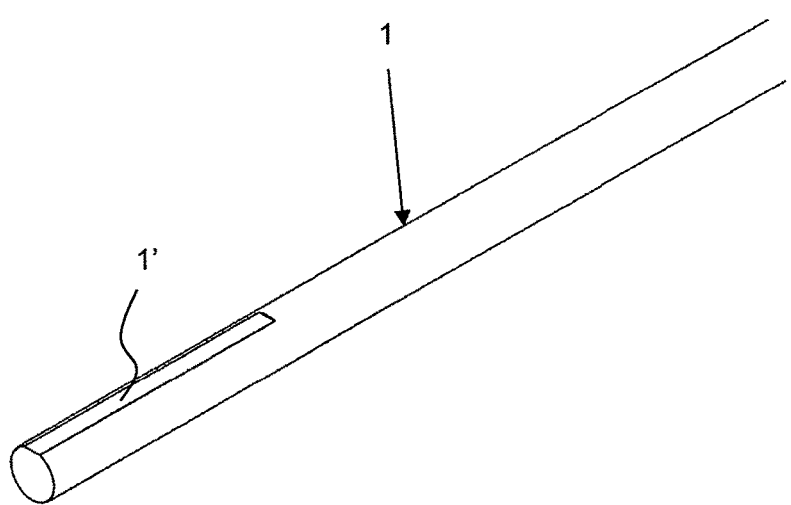
FIG. 9 a perspective view of the part of the drilling needle with the flattened section.

The drilling needle-drill chuck assembly illustrated in FIG. 1 comprises the motor drive shaft 12 connected with the motor 11 and the drive-associated coupling disk 9 of the magnetic coupling. The housing segment 4 surrounding the drive-associated coupling partner 9 is connected with the motor housing 5. The motor drive shaft 12 is connected for torque transmission in a contactless manner by means of the magnetic coupling 8, 9 with the drilling needle receptacle or the receiving element 7 in that the flattened end section 1' of the drilling needle 1 is clamped by the clamping bodies 10 and the clamping insert 6. The drilling needle 1 according to the invention, provided with the flattened end section 1' and less prone to needle breakage, is also shown in FIG. 9. The cross-sectional size of the drilling needle 1 measured at a right angle to the flattened portion of the end section 1' is at most 5%, preferably 3%, smaller than the diameter of the drilling needle 1.

The receiving element 7 is radially secured also in a contactless manner by an annular magnet 13 which is seated on the inner wall of the housing section 3. For this purpose, a spacer ring 14 of the receiving element 7 that can be magnetically affected is provided. Due to the contactless radial guiding action and the contactless coupling with the drive shaft 12, the imbalance that is occurring due to the flattened end 1' of the drilling needle 1 at the receiving element 7 upon rotation of the drilling needle 1 can be compensated or tolerated. The drilling needle 1 is axially centered by the guiding sleeve 17 which is supported in the through opening of the front cover 2 and extends thus concentric with the motor drive shaft 12, independent of the eccentric displacements occurring at the receiving element 7 as a result of the imbalance.

The here illustrated front cover 2 comprises on a circumferential inner wall a thread with which it can be screwed onto the housing section 3 which is provided with an appropriate thread at the outer circumference. Alternatively, the front cover 2 can also be connected non-detachably with the housing section 3, for example, adhesively. In contrast thereto, the housing section 3 is detachably connected with the housing segment 4. For this connection, a thread can be provided on an inner circumferential section of the housing section 3 and on an outer circumference of the housing segment 4, as shown in the illustrated embodiment. Of course, also other configurations of the housing components are conceivable. For adjustment of the axial distance between the coupling partners 8, 9, the screw-in depth between housing section 3 and housing segment 4 can be simply varied which can be realized manually or in an automated fashion by means of appropriate actuator means or it is also possible to employ a housing section 3 with a different length, for example. Moreover, between the housing section 3 and the housing segment 4 a mechanical locking device 19 can be provided for adjustment of the transmitted torque, as is indicated by the dotted illustration in FIG. 1. Further alternatives for adjustment of the axial distance between the coupling partners 8, 9 are residing in an axially adjustable connection of one or both coupling partners 8, 9 on the receiving element 7 and/or the drive shaft 12.

Also, when exchanging the drill chuck, for which purpose the housing section 3 connected to the front cover 2 is detached from the housing segment 4, the same transmitted torque can be maintained by adjusting the distance of the two coupling partners 8, 9.

The connections of receiving element 7 and motor drive shaft 12 with respective coupling partners 8, 9 are realized by fastening pins 16 which secure the hollow-cylindrical sections of the coupling partners 8, 9 on the sections of the receiving element 7 or of the motor drive shaft 12 received therein.

Figure 2:
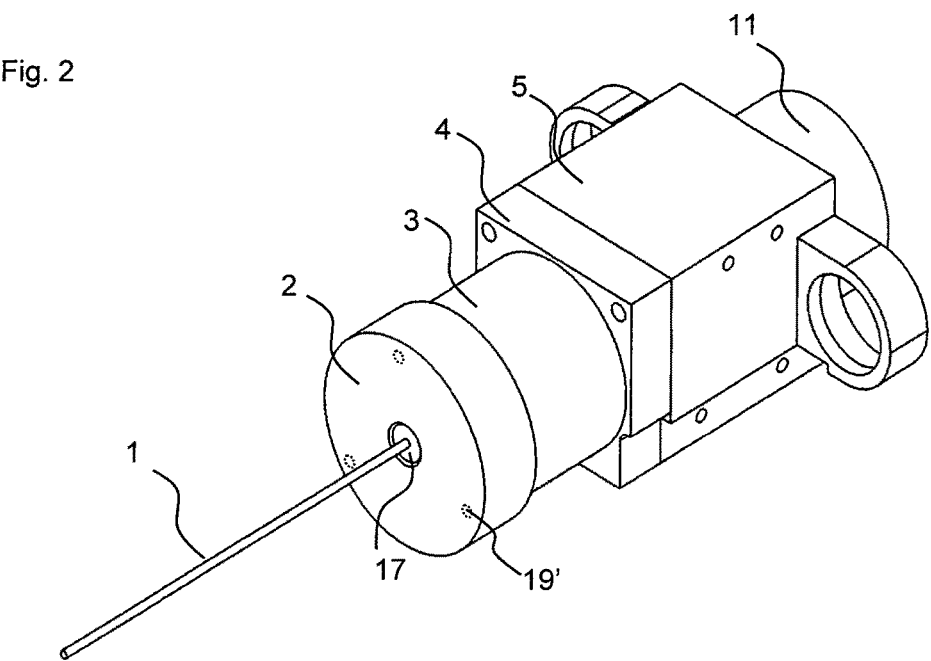
FIG. 2 a perspective view of the drill chuck according to the invention with clamped drilling needle.

FIG. 2 shows the drilling needle-drill chuck assembly from the exterior with the drilling needle 1 guided in the guiding sleeve through the through opening in the front cover 2, wherein the drilling needle is connected by means of the housing section 3 with the drive shaft-associated housing segment 4. The housing segment 4 and the motor housing 5 can be connected to each other, for example, by means of screws or pins. Moreover, at the front cover 2 adjusting positions 19' are indicated here in dotted lines where a respective mechanical locking device 19, as indicated in FIG. 1, can be adjusted for adjustment of the transmitted torque.

Figure 3:
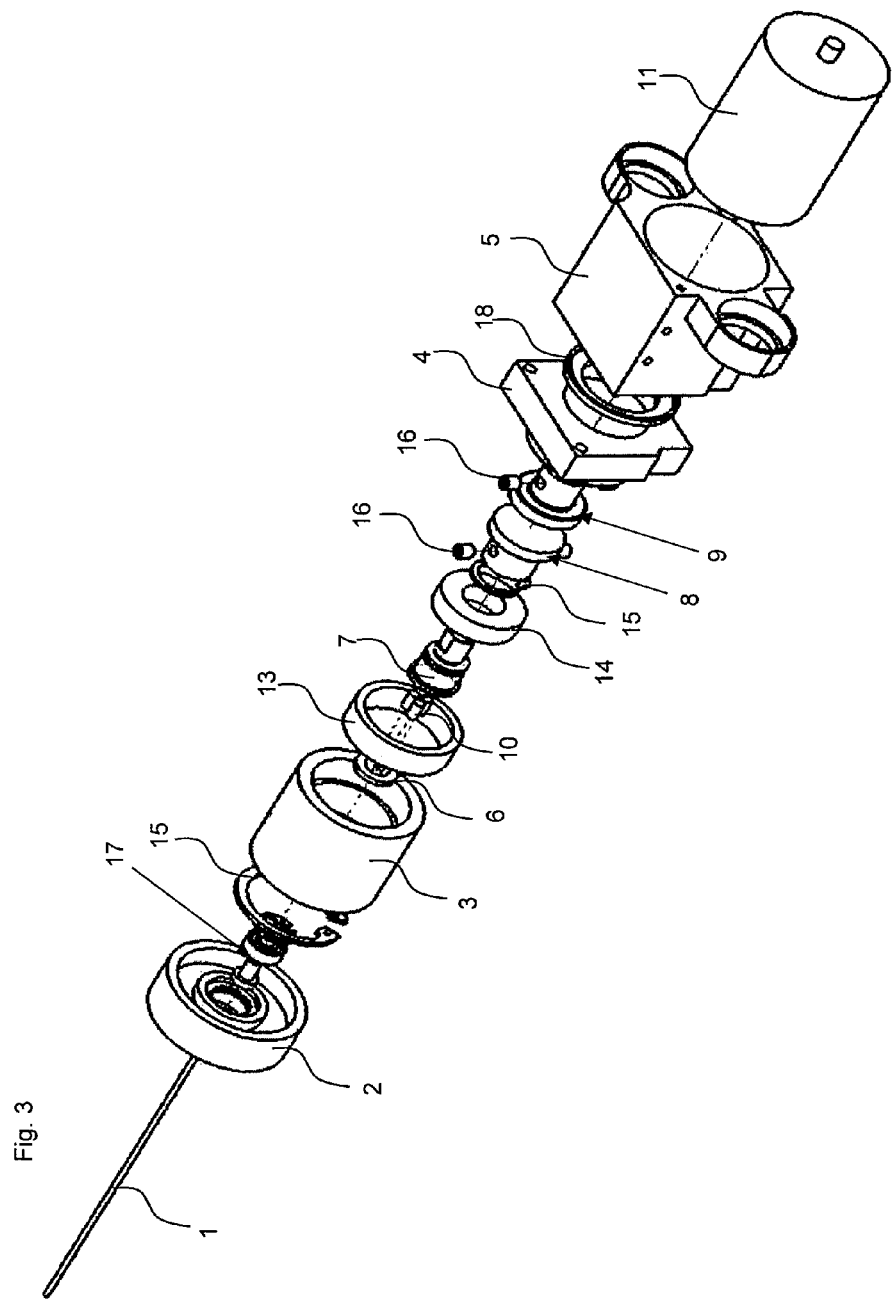
FIG. 3 a perspective exploded view of the drilling needle drill chuck according to the invention.

The exploded view in FIG. 3 of the drilling needle-drill chuck assembly according to the invention illustrates the arrangement of the individual components of FIG. 1. In addition, fixation rings 15 that serve for axial fixation of the individual components such as the magnetic ring 13 in the housing section 3, the spacer ring 14 on the cylindrical section of the receiving element 7, are identified as well as the sealing ring 18 between housing segment 4 and motor housing 5.

Figure 4:
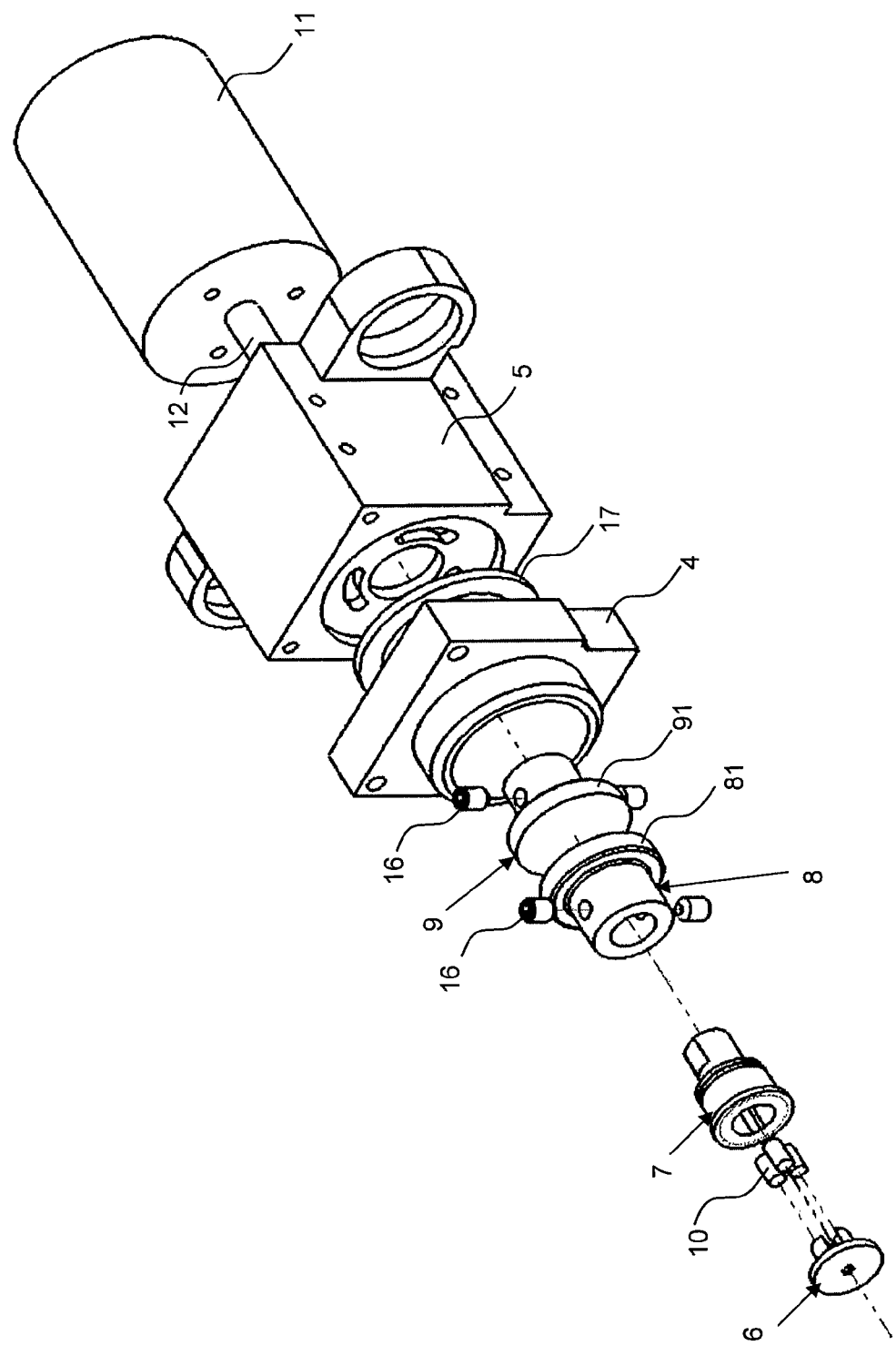
FIG. 4 a perspective exploded view of a part of the components of the drilling needle drill chuck according to the invention.
Figure 5:
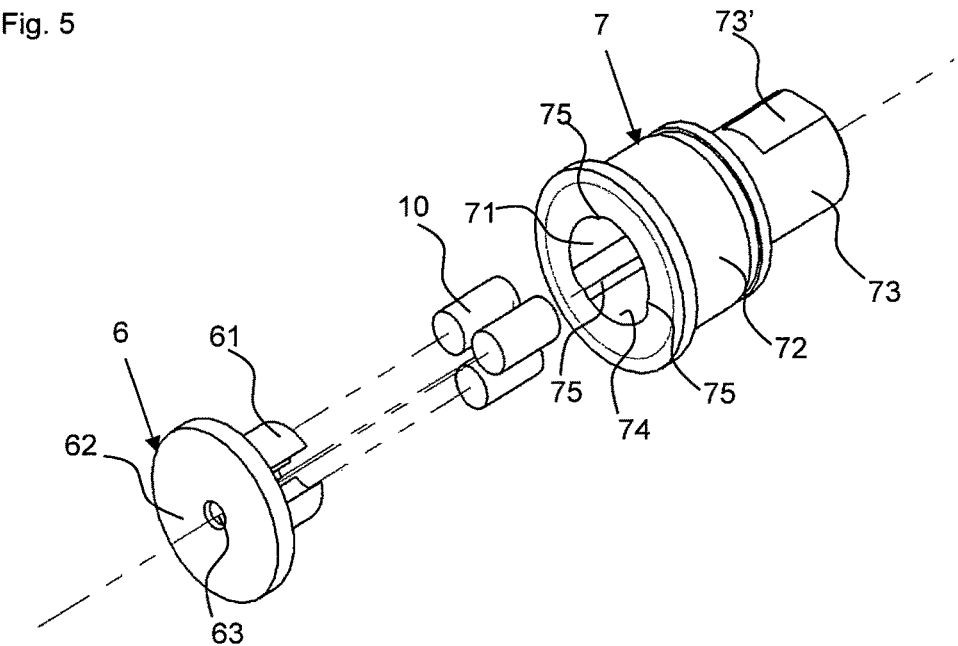
FIG. 5 a perspective detail view of the drilling needle receiving device of the drill chuck according to the invention.

FIGS. 4 and 5 show details of the drill chuck-drilling needle assembly according to the invention, in particular the coupling partners 8, 9 in FIG. 4 and the drilling needle receiving device in FIG. 5. Here, the receiving element 7 comprising the cylindrical section 72, provided with the recess 71, and comprising the pin section 73 which is to be connected with the hollow cylindrical section of the first coupling partner 8 is illustrated. The pin section 73 comprises for improved engagement of the fastening pins 16 a flattened portion 73'.

For positioning the spacer ring 14 (not illustrated in FIG. 4, 5) on the cylindrical section 72, the receiving element 7 has a stop ring which is formed by the laterally projecting end face. In accordance with the three counter bodies 61 of the clamping insert 6 which supplement the three clamping bodies 10, the wall of the recess 71 is divided into three segments 74 which are delimited by inwardly projecting stops 75.

The stop disk 62 with which the clamping insert 6 is contacting the end face of the cylindrical section 72 of the receiving element 7 comprises a central through opening 63 for the drilling needle which, with its flattened end section, is clamped between the clamping bodies 10 and the counter bodies 61 in the recess 71.

Figure 6:
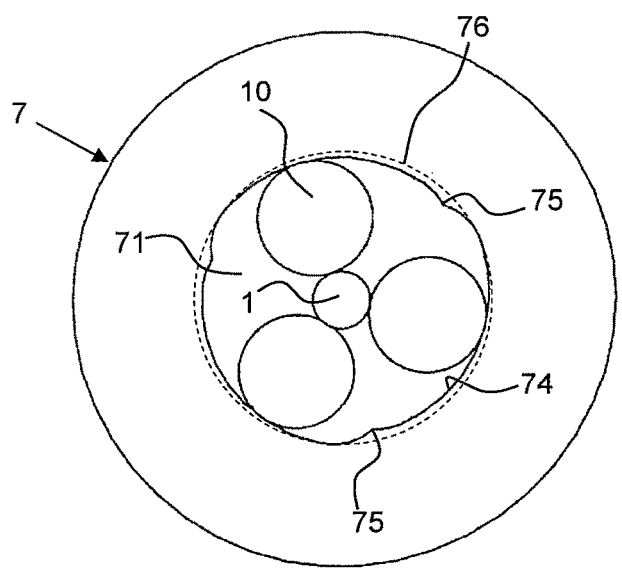
FIG. 6 a plan view of the receiving element with drilling needle received between the clamping bodies.

FIG. 6 illustrates the configuration of the wall segments 74 which deviate from a central circular profile 76. Each wall segment 74 corresponds to a section of a spiral line about the drilling needle 1 wherein the stops 75 each form the transition between a proximal segment section and a distal segment section of neighboring sections 74. When the clamping bodies 10 are moved into the distal segment sections, their spacing to the drilling needle 1 is enlarged and the clamping engagement is released. On the other hand, the drilling needle 1 is clamped between the clamping bodies 10 when the latter are moved in the direction toward the proximal segment sections.

Figure 7:
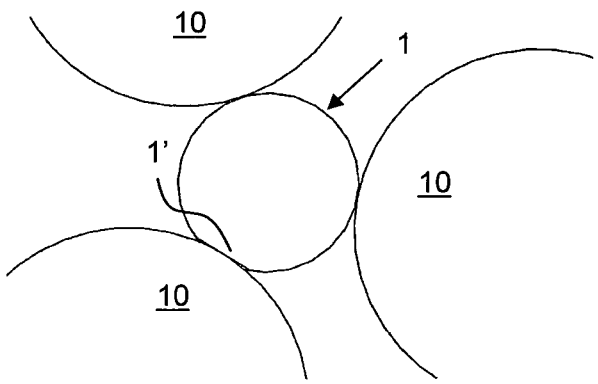
FIG. 7 a detail view of the drilling needle section which is received between the clamping bodies.
Figure 8:
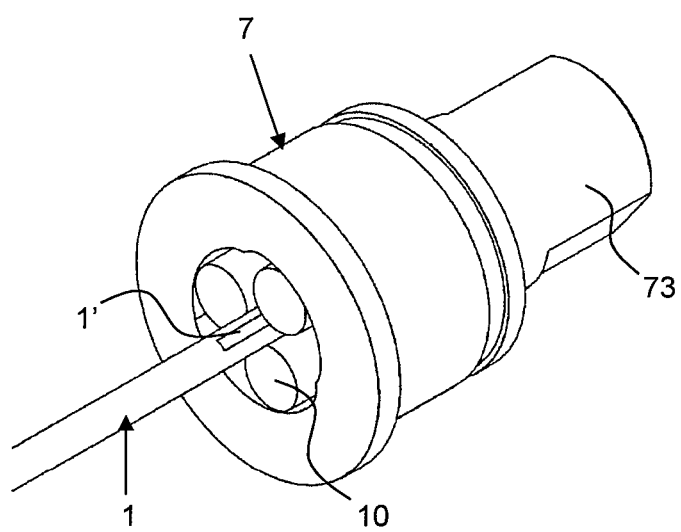
FIG. 8 a perspective view of the receiving element with drilling needle received between the clamping bodies.

The clamping action of the drilling needle 1 with the flattened end section 1' between the clamping bodies 10 is shown in detail in FIG. 7. On one of the clamping bodies 10, the flattened sections 1' is resting so that a certain eccentric arrangement of the drilling needle 1 in the receiving element 7 is realized (see also FIG. 8).

Figure 10:
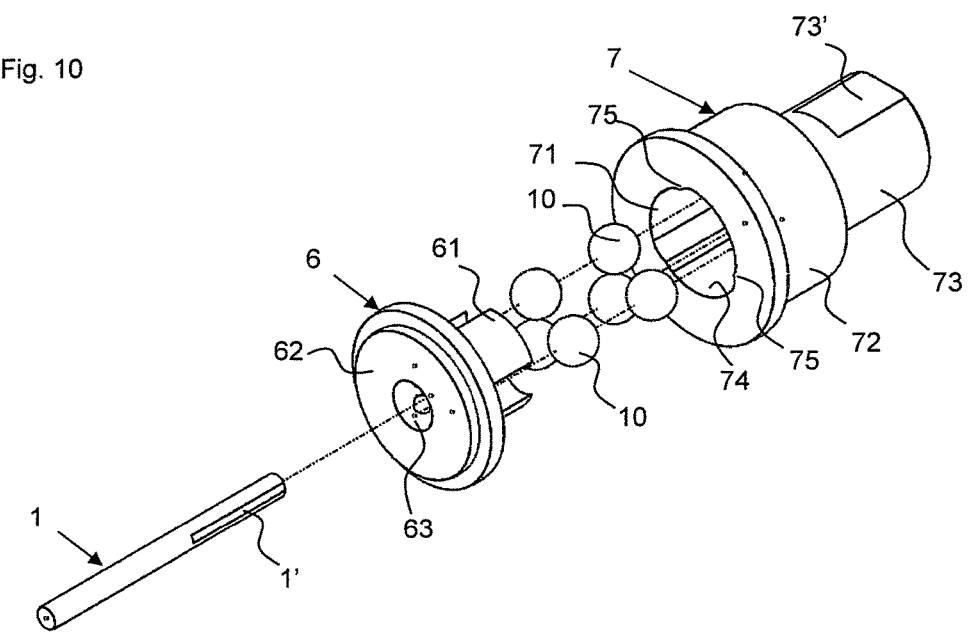
FIG. 10 a perspective detail view of the drilling needle receiving device of the drill chuck according to the invention with alternative clamping bodies.

A drilling needle receiving device according to the invention with alternative clamping bodies 10 is shown in FIG. 10. Here, balls are provided as clamping bodies 10 and are received in pairs between the counter bodies 61 of the clamping insert 6. The clamping insert 6 and the receiving element 7 correspond mostly to the example with the cylindrical clamping bodies illustrated in FIG. 5.

Figure 11:
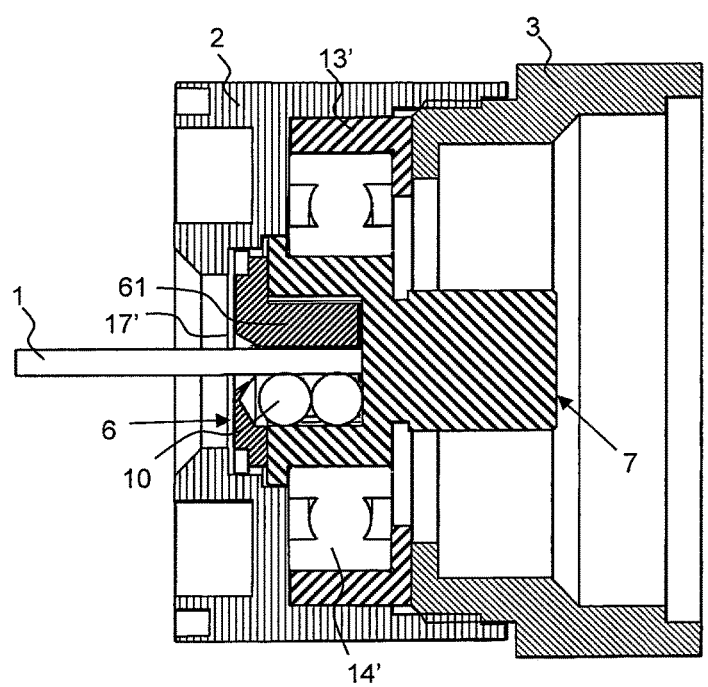
FIG. 11 a longitudinal section of the drilling needle receiving device of FIG. 10 with clamped drilling needle.

FIG. 11 shows the drilling needle receiving device with spherical clamping bodies 10 in longitudinal section; magnetic coupling and motor are not illustrated here in order to simplify the illustration and may correspond to the embodiment illustrated in FIG. 1. In contrast thereto, in the example illustrated in FIG. 11, the receiving element 7 is not radially secured by a spacer ring that can be magnetically influenced by an annular magnet but in a conventional way by means of a bearing 14' whose inner ring is seated on the cylindrical section 72 of the receiving element 7 and whose outer ring is secured by a stop sleeve 13'. The stop sleeve 13' is seated in an appropriately recessed section of the front cover 2 and is secured by means of the housing section 3 that is screwed to the cover.

The clamping insert 6 is secured by a disk 17', provided with a through opening for the drilling needle 1, by means of the screw connection of the front cover 2 with the housing section 3 in the recess 71 of the receiving element 7.

As can be seen in FIGS. 10 and 11, the spherical clamping bodies 10 are arranged in pairs in such a way that they replace the cylindrical clamping bodies 10 of FIGS. 1 to 5 and 8, i.e., the two balls arranged neighboring each other of a clamping body pair define an axis which is parallel to the drilling needle axis.

However, it should be noted that the examples illustrated in the Figures in regard to number and shape of the clamping bodies, counter bodies and segments in the recess of the receiving element are not to be understood as limiting in any way. For example, also more than two spherical clamping bodies can replace a cylindrical clamping body. Moreover, even though this is not preferred, the invention also encompasses that clamping bodies and counter bodies have a shape different from cylindrical or spherical shapes or that more than three cylindrical clamping bodies or more than three pairs of spherical clamping bodies with an appropriate number of counter bodies and shaped segments can be inserted into the recess of the receiving element in order to clamp the drilling needle.

1 drilling needle
1' flattened end section
2 front cover
3 housing section
4 housing segment
5 motor housing
6 clamping insert
61 counter body
62 stop disk
63 through opening
7 receiving element
71 recess
72 cylindrical section
73 pin
73' flattened portion
74 wall segment
75 stop
76 imaginary circular profile
8 drilling needle-associated coupling partner
81 magnetic coupling disk
9 drive-associated coupling partner
91 magnetic coupling disk
10 clamping body
11 motor
12 drive shaft
13 annular magnet
13' stop sleeve
14 magnetically affectable spacer ring
14' bearing
15 fixation ring
16 fastening pin
17 drilling needle guiding device
17' disk
18 sealing ring
19 mechanical locking device

What is claimed is:

1. A drill chuck comprising:
a drilling needle receiving device;
a hollow cylindrical magnetic holder configured to hold the drilling needle receiving device;
a coupling device configured to provide torque transmission from a drive device to the drilling needle receiving device;
wherein the drilling needle receiving device comprises a receiving element, one or more clamping bodies, and a clamping insert;
wherein the receiving element comprises at least one cylindrical section with a recess;
wherein the clamping insert comprises one or more counter bodies that supplement the one or more clamping bodies and that extend away from a stop disk of the clamping insert;
wherein the stop disk is resting on an end face of the at least one cylindrical section and comprises a through opening configured to allow a drilling needle to pass through;
wherein the one or more counter bodies and the one or more clamping bodies are configured in regard to dimensions and shape to be arranged in the recess and to receive and clamp releasably a flattened end section of a drilling needle between the one or more clamping bodies and the one or more counter bodies;

wherein the coupling device is a magnetic coupling device, wherein the drilling needle receiving device comprises a first coupling partner with a magnetic coupling disk configured to be brought into operative engagement with a magnetic coupling disk of a drive-associated second coupling partner in a contactless way, and wherein the hollow cylindrical magnetic holder is an annular magnet arranged spaced apart from and coaxially without contact about the cylindrical section of the receiving element.

2. The drill chuck according to claim 1, further comprising a magnetically affectable spacer ring surrounding the cylindrical section and positioned between the cylindrical section and the annular magnet.

3. The drill chuck according to claim 1, wherein the clamping bodies are cylindrical, wherein a circumferential wall of the recess is segmented into wall segments, wherein the number of the wall segments matches the number of the cylindrical clamping bodies.

4. The drill chuck according to claim 3, wherein the number of the cylindrical clamping bodies is three.

5. The drill chuck according to claim 3, wherein the wall segments, following a spiral line, each extend from a proximal segment section that is proximal to the drilling needle receivable between the clamping bodies to a distal segment section that is distal to the drilling needle receivable between the clamping bodies, and wherein a transition is formed, respectively, between the proximal segment section and the distal segment section of two of the wall segments positioned adjacent to each other, wherein the transitions each form a stop that projects into the recess.

6. The drill chuck according to claim 1, wherein the clamping bodies are spherical and are arranged in pairs to supplement respectively the counter bodies, wherein a circumferential wall of the recess is segmented into wall segments, wherein the number of the wall segments matches the number of the pairs of the spherical clamping bodies.

7. The drill chuck according to claim 6, wherein the number of the spherical clamping bodies is six.

8. The drill chuck according to claim 6, wherein the wall segments, following a spiral line, each extend from a proximal segment section that is proximal to the drilling needle receivable between the clamping bodies to a distal segment section that is distal to the drilling needle receivable between the clamping bodies, and wherein a transition is formed, respectively, between the proximal segment section and the distal segment section of two of the wall segments positioned adjacent to each other, wherein the transitions each form a stop that projects into the recess.

9. A drilling needle-drill chuck assembly comprising a drill chuck according to claim 1 and a drilling needle comprising a flattened end section on one side, the drilling needle received in the drilling needle receiving device of the drill chuck.

10. The drilling needle-drill chuck assembly according to claim 9, wherein a cross-sectional size of the drilling needle measured at a right angle to A flattened portion of the flattened end section is at most 5% smaller than a diameter of the drilling needle.

11. A drill chuck comprising:
a drilling needle receiving device;
a hollow cylindrical magnetic holder configured to hold the drilling needle receiving device;
a coupling device configured to provide torque transmission from a drive device to the drilling needle receiving device;
wherein the drilling needle receiving device comprises a receiving element, one or more clamping bodies, and a clamping insert;
wherein the receiving element comprises at least one cylindrical section with a recess;
wherein the clamping insert comprises one or more counter bodies that supplement the one or more clamping bodies and that extend away from a stop disk of the clamping insert;
wherein the stop disk is resting on an end face of the at least one cylindrical section and comprises a through opening configured to allow a drilling needle to pass through;
wherein the one or more counter bodies and the one or more clamping bodies are configured in regard to dimensions and shape to be arranged in the recess and to receive and clamp releasably a flattened end section of a drilling needle between the one or more clamping bodies and the one or more counter bodies;
wherein the coupling device is a magnetic coupling device, wherein the drilling needle receiving device comprises a first coupling partner comprising a magnetic coupling disk configured to be brought into operative engagement with a magnetic coupling disk of a drive-associated second coupling partner in a contactless way, wherein the first coupling partner comprises a hollow cylinder section which is connected with the magnetic coupling disk, wherein the receiving element comprises a pin section received in and fixedly connected with the hollow cylinder section.

12. A drilling needle-drill chuck assembly comprising a drill chuck according to claim 11 and a drilling needle comprising a flattened end section on one side, the drilling needle received in the drilling needle receiving device of the drill chuck.

13. The drilling needle-drill chuck assembly according to claim 12, wherein a cross-sectional size of the drilling needle measured at a right angle to a flattened portion of the flattened end section is at most 5% smaller than a diameter of the drilling needle.

14. A drill chuck comprising:
a drilling needle receiving device;
a hollow cylindrical magnetic holder configured to hold the drilling needle receiving device;
a coupling device configured to provide torque transmission from a drive device to the drilling needle receiving device;
wherein the drilling needle receiving device comprises a receiving element, one or more clamping bodies, and a clamping insert;
wherein the receiving element comprises at least one cylindrical section with a recess;
wherein the clamping insert comprises one or more counter bodies that supplement the one or more clamping bodies and that extend away from a stop disk of the clamping insert;
wherein the stop disk is resting on an end face of the at least one cylindrical section and comprises a through opening configured to allow a drilling needle to pass through;
wherein the one or more counter bodies and the one or more clamping bodies are configured in regard to dimensions and shape to be arranged in the recess and to receive and clamp releasably a flattened end section of a drilling needle between the one or more clamping bodies and the one or more counter bodies;

a front cover comprising an opening for the drilling needle and further comprising a housing section that is detachably connectable or non-detachable connected to the front cover, wherein the coupling device is a magnetic coupling device, wherein the drilling needle receiving device comprises a first coupling partner with a magnetic coupling disk configured to be brought into operative engagement with a magnetic coupling disk of a drive-associated second coupling partner in a contactless way, wherein the housing section is connected detachably with a housing segment surrounding the drive-associated second coupling partner, and wherein the hollow cylindrical magnetic holder is arranged on an inner wall of the housing section.

15. The drill chuck according to claim 14, further comprising a drilling needle guiding device comprising a drilling needle guiding sleeve supported rotatably in the opening of the front cover so that the drilling needle, guided in the drilling needle guiding device, when the drill chuck is coupled to a drive device, is positioned concentrically with a motor drive shaft of the drive device.

16. The drill chuck according to claim 14, wherein a distance between the magnetic coupling disks is adjustable for variation of a transmitted torque.

17. The drill chuck according to claim 16, wherein the distance is adjustable by axially adjusting the housing section relative to the housing segment.

18. A drilling needle-drill chuck assembly comprising a drill chuck according to claim 13 and a drilling needle comprising a flattened end section on one side, the drilling needle received in the drilling needle receiving device of the drill chuck.

19. The drilling needle-drill chuck assembly according to claim 18, wherein a cross-sectional size of the drilling needle measured at a right angle to a flattened portion of the flattened end section is at most 5% smaller than a diameter of the drilling needle.

* * * * *